United States Patent Office 3,499,937
Patented Mar. 10, 1970

---

3,499,937
POLYCYCLIC ALCOHOL, COMPOSITIONS CONTAINING SAME AND PROCESS THEREFOR
Julian Dorsky, Rockaway, and William M. Easter, Jr., Hasbrouck Heights, N.J., assignors to The Givauda Corporation
No Drawing. Filed June 9, 1961, Ser. No. 115,928
Int. Cl. C07c *35/22;* C11b *9/00*
U.S. Cl. 260—617                                    4 Claims The present invention relates to a novel polycyclic alcohol, perfume compositions containing said alcohol and a process for preparing both.

An object of this invention is to prepare products having a very fine and tenacious sandalwood-like odor.

Another object of this invention is to prepare said products by a novel and simple process from readily available, inexpensive chemicals.

A further object is to provide a satisfactory substitute for expensive sandalwood oil.

Other objects will become apparent from the following detailed description.

In perfumery, perhaps the most desired of the popular wood notes, as well as the most expensive and least available, is the sandalwood odor. Oil of sandalwood, therefore, while being highly prized in the perfume world because of its desirable odor, has enjoyed only limited use, on account of its limited availability and high cost.

In the past, efforts have been made to produce synthetic substitutes for the natural oil of sandalwood, but they have met with limited success. One of the products heretofore known is the chemical, 1-oxy-2-methoxy-4-camphylcyclohexane, also sometimes referred to as bornylhexahydroguaiacol, which was first described in reports captured from the Germans after World War II and then in German Patent 876,241. The formula of the aforementioned compound may be represented as follows:

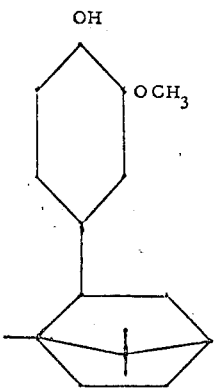

Certain Russian workers, in 1957, published an industrial method for the manufacture of this compound, bornylhexahydroguaiacol, which they termed, Santalidol, and described it as having a fairly mild odor of the sandalwood type. L. A. Kheifits et al., Masloboino-Zhirovaya Prom. 23, No. 6, 35–38 (1957); Chem. Abs., 51, 17,107$^d$ (1957).

The process employed by Kheifits et al. involves the hydrogenation of bornylguaiacol in the presence of Raney nickel at elevated temperature and pressure. We have repeated their process and succeeded in obtaining a product as described, namely, bornylhexahydroguaiacol.

In accordance with our present invention, we have, surprisingly, found that by modifying the Kheifits et al. process to increase the amount of hydrogen absorbed by the bornylguaiacol, we have succeeded in obtaining a product which has a materially and unexpectedly greater perfume value than that obtained in accordance with the Kheifits et al. process. We have also found that the increased amount of hydrogen which we employ alters the chemical nature of the product. Instead of bornylhexahydroguaiacol, $C_{17}H_{30}O_2$, which contains one hydroxyl (OH) and one methoxyl ($OCH_3$) group, we form a new polycyclic alcohol, $C_{16}H_{28}O$, which has one hydroxyl and no methoxyl group. The methoxyl group was removed by hydrogenolysis. Our work has demonstrated further that this compound possesses a strong, sandalwood-type odor and that pure bornylhexahydroguaiacol is odorless.

We have found that compositions which contain 50% by weight of this polycyclic alcohol exhibits little effectiveness as perfume materials. Compositions which contain 60% or more of the polycyclic alcohol, which are produced by our improved process, possess unexpected high perfume value.

The polycyclic alcohol has been prepared in pure form by careful fractionation. It is a viscous, colorless oil with a strong sandalwood-type odor. We have assigned to this compound the formula, 11-hydroxy-2,13,13-trimethyl-tricyclo[6.4.0.1$^{2,5}$]tridecane, which may be represented as follows:

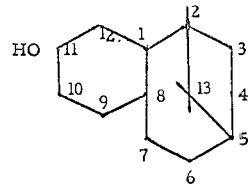

Our novel alcohol is a mixture which contains at least four isomers as indicated by the number of peaks appearing on its gas-liquid chromatogram.

In general, therefore, our novel product comprises at least 55%, by weight, of the aforementioned polycyclic alcohol, $C_{16}H_{28}O$, the balance, if any, being a material having the formula:

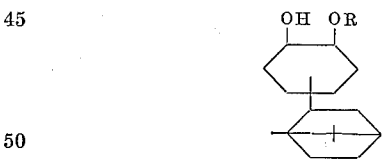

where R is a lower aliphatic hydrocarbon radical having up to 5 carbon atoms or cycloaliphatic hydrocarbon radical having up to 2 carbon atoms in the side chain. The side chain may be joined to the cycloaliphatic nucleus at any of the available positions and mixtures of the resulting position isomers may be used.

Our novel process, in accordance with this invention, comprises hydrogenating a material having the formula:

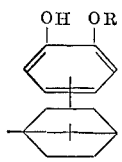

where R is a lower aliphatic hydrocarbon radical having up to 5 carbon atoms or an aromatic of cycloaliphatic hydrocarbon radical having up to 2 carbon atoms in the side chain, in the presence of a nickel hydrogenating catalyst or copper chromite at an elevated temperature and pressure, until at least 3.5 moles of hydrogen per mole of said material have been absorbed.

As examples of materials employed in accordance with our process, we refer to bornylguaiacol and other materials in which R in the formula may be $C_2H_5$, benzyl and cyclohexyl.

As hydrogenating catalysts operable in accordance with our present invention may be mentioned Raney nickel, supported nickel catalysts such as Girdler G–49, and copper chromite.

As regards the amount of hydrogen used in our process, it is essential that at least 3.5 moles per mole of the aforementioned material be employed. Amounts of hydrogen from about 4–5 moles, on the same basis, are preferred. Amounts of hydrogen up to about 3.3 moles per mole of starting material, employed by the Russian workers, give materially inferior products.

As regards the amount of catalyst employed, we have found that at least about 1 percent, by weight, on the amount of bornylguaiacol or other starting material gives satisfactory results. While there is no upper theoretical limit to the amount of catalyst which can be used, practical and economic considerations impose limits thereto. With these in mind, we prefer to employ about 2 to 5 percent, on the indicated basis, of the catalyst.

In carrying out our process, the bornylguaiacol or another of the aforementioned starting materials, and the catalyst are charged into a high pressure hydrogenation apparatus and the desired temperature and pressure conditions are impressed.

We have found that temperatures between about 140° C. and 250° C., and pressures above 250 pounds per square inch (p.s.i.) give satisfactory results. We prefer, in general, to employ temperatures within the range from about 175° C. to about 200° C. and pressures from about 400 to about 1,000 p.s.i.

Hydrogen gas is introduced and it is found that gas absorption is rapid until about 1.5 moles of hydrogen per mole of bornylguaiacol or other starting material is consumed. Pressure is reduced to atmospheric and volatile by-products are distilled off by applying a vacuum. This is termed venting. Pressure is then applied; hydrogen gas is introduced and when the rapid absorption of gas stops again, the venting procedure is applied again. This procedure of alternate introduction of hydrogen under pressure following by venting is repeated until the desired amount of hydrogen has been absorbed.

To obtain a composition having about 55% by weight of the aforementioned polycyclic alcohol, $C_{16}H_{28}O$, it usually takes about five repetitions of the hydrogen absorption and venting cycles. Products formed by hydrogenolysis include water, alcohols, such as methanol, and hydrocarbons such as methane. Their removal by venting is essential for the completion of the reaction.

The crude hydrogenated product is distilled under reduced pressure. The main distillate, after a forerun which is the hydrocarbon, $C_{16}H_{28}$, formed by complete hydrogenolysis, is the desired composition, comprising essentially the aforementioned polycyclic alcohol, $C_{16}H_{28}O$, and a material having the formula,

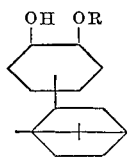

where R is a lower aliphatic hydrocarbon radical having up to 5 carbon atoms or a cycloaliphatic hydrocarbon radical having up to 2 carbon atoms in the side chain.

The following examples are given in order further to explain our invention. Unless otherwise stated, the parts are by weight, and the temperature is in degrees centigrade.

EXAMPLE I

Preparation of bornylguaiacol

Camphene (815 g.) is added from a heated dropping funnel over one hour or more at 100° to 150° C. to guaiacol (745 g.) and Filtrol (48 g.), an acid clay alkylation catalyst. The mixture is stirred one hour after the camphene has been added and is washed to a pH of 7.

On distillation bornylguaiacol (1,000 g.) is obtained. It has the following properties: $b._{2-3\,mm.}$ 167°–173° C., $n_D^{20}$ 1.543–1.546, Sp. Gra. 25/25 1.06, hydroxyl value 227 (Theory 216), methoxyl 11.3% (Theory 11.9%).

EXAMPLE II

Preparation of 11-hydroxy-2,13,13-trimethyl-tricyclo-[6.4.0.1$^{2,5}$]-tridecane Bornylguaiacol (1,000 g.) and Raney nickel catalyst (25 g.) are charged to a high pressure, steel hydrogenator and hydrogenation is conducted at 600 p.s.i. and 175° C. Absorption is rapid until about 1.5 moles hydrogen per mole bornylguaiacol is consumed. Thereafter, absorption is slow and it is not possible to complete the hydrogenation even by raising the pressure to 2,000 p.s.i. The pressure is then reduced to atmospheric by venting and vacuum (200 mm. Hg) is applied to distill off volatile by-products which stop the hydrogenation. Hydrogen pressure is built up to 600 p.s.i. and very rapid absorption occurs for about 30 minutes. This procedure is repeated about ten times until the refractive index of the product is 1.508–1.505 and the methoxyl content is less than 2%. Water, methanol and methane are formed by hydrogenolysis. Their removal by venting is essential for completion of the reaction. One mole of water and one-tenth mole of methanol per mole of bornylguaiacol hydrogenated can be collected by cooling the vented gas. A total of about 4.5 moles hydrogen is consumed per mole bornylguaiacol. Of this, 3.0 moles is required to saturate the benzene ring and the remainder for hydrogenolysis of the methoxyl and hydroxyl groups. The crude hydrogenated product weighs 925 g.

Distillation at 2 mm. yielded the following fractions:

| No. | B.P. | $n_D^{20}$ | Grams |
|---|---|---|---|
| 1 | 111–113 | 1.493–1.494 | 55 |
| 2 | 140–160 | 1.506–1.508 | 810 |
| 3 | >160 | 1.52 | 45 |
| 4 | Residue | | 15 |

No. 1 is a practically odorless hydrocarbon $C_{16}H_{28}$ formed by complete hydrogenolysis. Found (percent): C, 87.12; H, 12.80. Calc'd (percent): C, 87.20; H, 12.80.

No. 2 is a polycyclic alcohol, $C_{16}H_{28}O$. Found (percent): C, 81.13; H, 11.54; $CH_3O$, 0.0; hydroxyl value by acetylation, 240. Calc'd. (percent): C, 81.32; H, 11.92; $CH_3O$, 0.0; hydroxyl value, 237. It is a viscous, colorless oil with a strong sandalwood-type odor.

No. 3 is a mixture containing No. 2 and unreacted bornylguaiacol.

EXAMPLE III

Preparation of composition containing about 55 percent of polycyclic alcohol of Example II and about 45 percent of bornylhexahydroguaiacol Bornylguaiacol is hydrogenated as in Example II except that the venting procedure is repeated only until the methoxyl content has been reduced to about 5.0%. About five ventings are required. The refractive index of the product is about 1.510. Distillation yields about 820 grams of product ($b._{2mm.}$140–160° C.) containing about 5.3% methoxyl.

EXAMPLE IV

Preparation of hexahydrobornyl guaiacol

Bornylhexahydroguaiacol was made by hydrogenating bornylguaiacol (1,000 g.) with a mixture of Raney nickel (10 g.) and 5% palladium on carbon (10 g.) catalysts at 175° C. and 400 p.s.i. Distillation at 4 mm. yielded 925 grams of a viscous, colorless oil that is practically odorless. It has the following properties and analysis: b.$_4$ 175–180° C.; $n_D^{20}$ 1.504–1.508; hydroxyl value by acetylation, 205 (Theory 210%); methoxyl, 11.3 (Theory 11.6%). Gas-liquid chromatography (248° C. Apiezon L) separated five peaks which were different from the peaks obtained with the polycyclic alcohol, $C_{16}H_{28}O$. Three moles of hydrogen were consumed per mole bornylguaiacol and only a trace of water was formed during the hydrogenation.

EXAMPLE V

Preparation of 11-hydroxy-2,13,13-trimethyltricyclo-[6.4.0.1$^{2,5}$]-tridecane Bornylhexahydroguaiacol (1,000 g.) and copper chromite (200 g.) are charged to a high pressure hydrogenator and the batch is hydrogenated at 2,000 p.s.i. and 250° C. Hydrogen is absorbed for a few hours and then ceases. The gas is vented and vacuum applied to remove low boiling hydrogenolysis products. When the hydrogen pressure is built up to 2,000 p.s.i. absorportion proceeds rapidly for a short time. The venting procedure is repeated five times. After 52 hours and a total of six ventings there is obtained 800 grams of a viscous oil which contains 67% polycyclic alcohol, $C_{16}H_{28}O$, 13% unreacted bornylhexahydroguaiacol and 13% of a hydrocarbon, $C_{16}H_{28}$, formed by complete hydrogenolysis of the starting material.

Raney nickel can also be used as catalyst for this hydrogenolysis.

EXAMPLE VI

Preparation and perfume evaluation of compositions containing varying amounts of novel polycyclic alcohol and bornylhexahydroguaiacol Pure hexahydrobornylguaiacol, as obtained in accordance with Example IV above, and pure 11-hydroxy-2,13,13-trimethyltricyclo-[6.4.0.1$^{2,5}$]-tridecane, as obtained in accordance with Example II, were mixed together in proportions so as to give compositions having the following percentages of the latter (the difference from 100% in each case being the former): 0, 10, 20, 30, 40, 50, 60, 70, 80, 90 and 100.

The various so-formed compositions were (a) each dissolved in ethyl alcohol to the extent of 5%; (b) incorporated into soap cakes of uniform composition; and (c) incorporated into several different perfume compositions. The alcohol solutions were applied to perfumers' smelling blotters and studied organoleptically during a dryout period of 3 days; the soap cakes were exposed to daylight and air for a period of 3 weeks and then examined and studied organoleptically; and the resulting perfume compositions were dissolved to the extent of 15% in ethyl alcohol and then evaluated for odor excellence on smelling blotters and applied to the skin on the back of the hand.

The following were the findings:

(1) Bornylhexahydroguaiacol is practically odorless and devoid of perfume value. In fact, it exerts a deadening effect on the perfume fragrance.

(2) The polycyclic alcohol, $C_{16}H_{28}O$, possesses a strong, sandalwood-type odor and it alone is responsible for the sandalwood-type odor and accompanying perfume value of the products obtained by hydrogenating bornylguaiacol.

(3) Perfumes in which compositions containing less than 50% of the polycyclic alcohol were employed exhibited important deficiencies in amount of fragrant quality, diffusiveness of topnote, stability of odor character in dryout, harmony and persistence in general. From this the mixtures employed were judged to exhibit little effectiveness as perfume materials and therefore to have a low order of value to the perfumer. A qualified expert judged that these materials would be worth about $1.00 per pound because of their ineffectiveness and relative to the many available perfume materials at a variety of different prices.

By contrast, the same perfumes in which compositions containing 60% or more of the polycyclic alcohol were employed exhibited high perfume excellence, having abundance of fragrant quality, good diffusive topnotes, stable odor character in dryout, harmonious and persistent odors.

The mixtures employed were judged to be highly valuable perfume materials. A qualified expert judged that such materials would be worth $6.00 to $12.00 per pound considering their unusually good effects and relative to the many available perfume materials available at a wide variety of different prices.

(4) The aforementioned Russian product is the perfume equivalent of the composition of this example having 30% of the polycyclic alcohol.

The foregoing illustrates the practice of this invention, which, however, is not to be limited thereby but is to be construed as broadly as permissible in view of the prior art and limited solely by the appended claims.

We claim:

1. A process for making the polycyclic alcohol, $C_{16}H_{28}O$, which comprises alternately introducing hydrogen into a material having the formula:

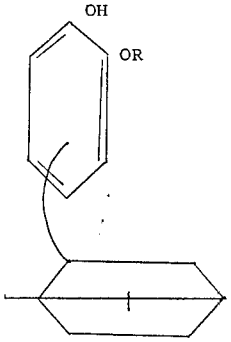

wherein R is a member of the group selected from the group consisting of lower aliphatic hydrocarbon radicals having up to 5 carbon atoms, and aromatic and cycloaliphatic hydrocarbon radicals having up to 2 carbon atoms in the side chain, in the presence of a catalyst selected from the group consisting of nickel hydrogenating catalysts and copper chromite, at an elevated temperature and pressure suitable for hydrogenation, and venting the reaction mixture to remove formed volatile undesirable by-products, the alternate introduction of hydrogen and the venting being repeated until from about 4 to 5 moles of hydrogen per mole of said material are absorbed, and said polycyclic alcohol is distilled from the reaction mixture in substantially pure form.

2. A process according to claim 1, wherein 4.6 mols of hydrogen per mole of said material are employed, and said polycyclic alcohol is isolated from the reaction in substantially pure form.

3. A process for making the polycyclic alcohol, $C_{16}H_{28}O$, which comprises alternately introducing hydrogen into bornylguaiacol, in the presence of Raney nickel at a temperature of about 175° C. and a pressure around 600 p.s.i. and venting the reaction mixture to remove formed volatile undesirable by-products the alternate introduction of hydrogen and the venting being repeated until a total of about 4.5 mols of hydrogen per mol of bornylguaiacol has been consumed, and distilling the desired polycyclic alcohol, which is a viscous, colorless oil having a strong sandalwood-type odor, B.P. of 140°–160° C. at 2 mm. Hg pressure, and $n_D^{20}$=1.506–1.508.

4. A viscous, colorless oil, having a strong, sandalwood-type odor, consisting essentially of a material having the empirical formula, $C_{16}H_{28}O$ free of etheral oxygen, and having a boiling range between about 140°–160° C. under 2 mm. Hg pressure and a refractive index ($n_D^{20}$) of about 1.506–1.508.

References Cited

FOREIGN PATENTS 876,241  5/1953  Germany.

OTHER REFERENCES

Kheifits et al.: Chem. Abs., vol. 51 (1957), pp. 17, 107.

LEON ZITVER, Primary Examiner

JOSEPH E. EVANS, Assistant Examiner

U.S. Cl. X.R.

252—522; 260—611, 632, 667, 683.9